United States Patent
Tylutki et al.

(10) Patent No.: US 8,398,742 B2
(45) Date of Patent: Mar. 19, 2013

(54) PRESSURE SENSOR DISCONNECTION DETECTION SYSTEMS AND METHODS

(75) Inventors: Vincent J. Tylutki, Livonia, MI (US); Janean E. Kowalkowski, Northville, MI (US); Benjamin Radke, Waterford, MI (US)

(73) Assignee: GM Global Technology Operations LLC

( * ) Notice: Subject to any disclaimer, the term of this patent is extended or adjusted under 35 U.S.C. 154(b) by 40 days.

(21) Appl. No.: 13/111,401

(22) Filed: May 19, 2011

(65) Prior Publication Data

US 2012/0291629 A1  Nov. 22, 2012

(51) Int. Cl.
*B01D 46/46* (2006.01)

(52) U.S. Cl. ........... 95/20; 95/26; 95/278; 95/421; 95/424; 95/425; 55/282.3; 55/283; 55/385.3; 55/523; 55/DIG. 10; 55/DIG. 30

(58) Field of Classification Search ........... 55/282.3, 55/282.2, 283, 385.3, 523, DIG. 10, DIG. 30; 95/14, 15, 18, 19, 273, 278; 96/417, 418, 96/419, 420, 421; 60/273, 274, 286, 295, 60/297, 311

See application file for complete search history.

(56) References Cited

U.S. PATENT DOCUMENTS

| | | | | |
|---|---|---|---|---|
| 6,969,413 B2 * | 11/2005 | Yahata et al. | | 55/282.3 |
| 7,247,190 B2 * | 7/2007 | Miura | | 95/278 |
| 7,264,642 B2 * | 9/2007 | Hamahata et al. | | 55/282.3 |
| 7,468,085 B2 * | 12/2008 | Goddard | | 55/385.3 |
| 7,611,560 B2 * | 11/2009 | Ichikawa | | 55/523 |
| 7,611,567 B2 * | 11/2009 | Chiba et al. | | 95/278 |
| 7,655,065 B2 * | 2/2010 | Gonze et al. | | 55/523 |

\* cited by examiner

*Primary Examiner* — Duane Smith
*Assistant Examiner* — Minh-Chau Pham

(57) ABSTRACT

A system for a vehicle includes a regeneration module and a disconnection indication module. The regeneration module indicates when a regeneration of a particulate filter is complete. The disconnection indication module receives a pressure difference across the particulate filter measured using delta pressure sensor. The delta pressure sensor generates the pressure difference based on first and second pressures upstream and downstream of the particulate filter applied to the delta pressure sensor using upstream and downstream pressure lines, respectively. In response to an indication that the regeneration of the particulate filter is complete, the disconnection indication module selectively indicates that the downstream pressure line is disconnected based on a comparison of the pressure difference and a predetermined pressure.

20 Claims, 4 Drawing Sheets

PRESSURE SENSOR DISCONNECTION DETECTION SYSTEMS AND METHODS

FIELD

The present disclosure relates to internal combustion engines and more particularly to delta pressure sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve may control airflow into some types of engines, such as spark-ignition engines. In other types of engines, such as compression-ignition engines, a throttle valve may be omitted. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust may include particulate matter (PM) and gas. The exhaust gas includes nitrogen oxides (NOx), such as nitrogen oxide (NO) and nitrogen dioxide ($NO_2$). A treatment system reduces NOx and PM in the exhaust.

For example, the exhaust may flow from the engine to an oxidation catalyst (OC). The OC removes hydrocarbons and/or carbon oxides from the exhaust. The exhaust may flow from the OC to a selective catalytic reduction (SCR) catalyst. A dosing agent injector injects a dosing agent into the exhaust stream, upstream of the SCR catalyst. Ammonia ($NH_3$) provided by the dosing agent is absorbed by the SCR catalyst. Ammonia reacts with NOx in the exhaust passing the SCR catalyst. The exhaust may flow from the SCR catalyst to a particulate filter that filters particulate from the exhaust passing through the particulate filter.

SUMMARY

A system for a vehicle includes a regeneration module and a disconnection indication module. The regeneration module indicates when a regeneration of a particulate filter is complete. The disconnection indication module receives a pressure difference across the particulate filter measured using delta pressure sensor. The delta pressure sensor generates the pressure difference based on first and second pressures upstream and downstream of the particulate filter applied to the delta pressure sensor using upstream and downstream pressure lines, respectively. In response to an indication that the regeneration of the particulate filter is complete, the disconnection indication module selectively indicates that the downstream pressure line is disconnected based on a comparison of the pressure difference and a predetermined pressure.

A method for a vehicle, includes: indicating when a regeneration of a particulate filter is complete; receiving a pressure difference across the particulate filter measured using delta pressure sensor that generates the pressure difference based on first and second pressures upstream and downstream of the particulate filter applied to the delta pressure sensor using upstream and downstream pressure lines, respectively; and, in response to an indication that the regeneration of the particulate filter is complete, selectively indicating that the downstream pressure line is disconnected based on a comparison of the pressure difference and a predetermined pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
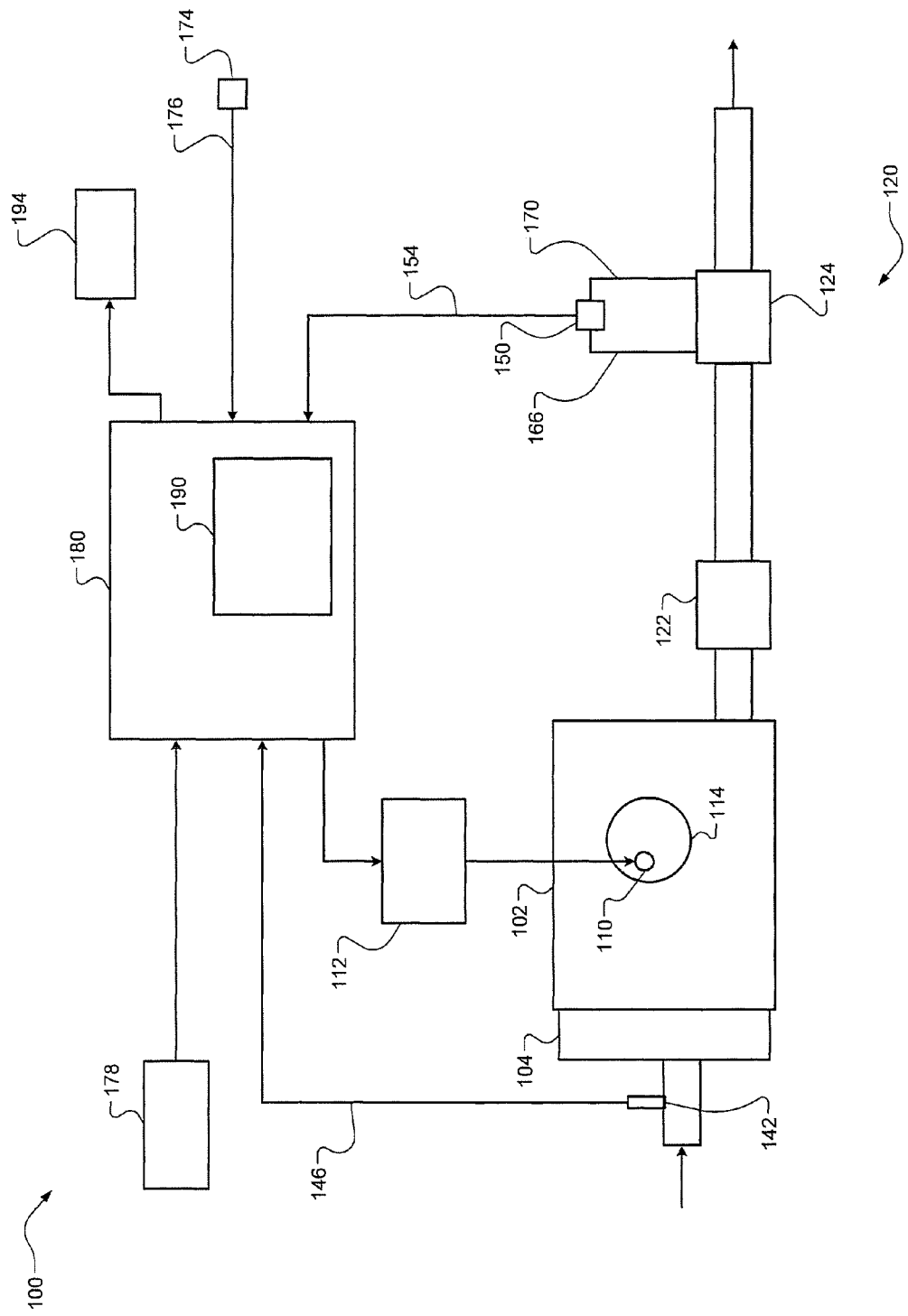
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A particulate filter receives exhaust output by an engine and filters particulate matter from the exhaust. A difference in pressure across the particulate filter can be measured using a delta pressure sensor. The difference in pressure across the particulate filter can be referred to as a delta pressure. The delta pressure sensor may generate the delta pressure based on first and second pressures upstream and downstream of the particulate filter. The first pressure is provided via a first line that receives pressure upstream of the particulate filter. The second pressure is provided via a second line that receives pressure downstream of the particulate filter.

A control module may, for example, estimate an amount of particulate matter trapped within the particulate filter based on the delta pressure. For example only, the control module may estimate that the amount of particulate matter increases as the delta pressure increases. The control module may perform a regeneration of the particulate filter when the amount of particulate matter trapped within the particulate filter is greater than a predetermined amount. The control module may estimate one or more other parameters based on the delta pressure, such as an efficiency of the particulate filter that is indicative of the particulate filter's ability to filter particulate matter output by the engine.

If the second line is disconnected, however, the delta pressure may increase relative to when the second line is connected to the delta pressure sensor. The increase in the delta pressure may cause the estimate of the amount of particulate matter trapped within the particulate filter to increase. The control module may therefore perform a regeneration of the particulate filter sooner than the regeneration would be performed if the second line was connected to the delta pressure sensor. The second line could be disconnected to defeat the control module's ability to accurately regenerate the particulate filter when the amount of particulate matter within the particulate filter is greater than the predetermined amount. Disconnection of the second line could also preclude the control module from detecting that the efficiency of the particulate filter to filter particulate matter is poor.

A disconnection detection module according to the present disclosure determines whether the second is connected between the delta pressure sensor and the location where the downstream pressure is obtained. The disconnection detection module may determine whether the second line is connected based on the delta pressure during a period after a regeneration of the particulate filter is complete.

Referring now to FIG. 1, a functional block diagram of an exemplary engine system 100 is presented. An engine 102 generates drive torque for a vehicle. While the engine 102 is shown and will be discussed as a diesel type engine, the engine 102 may be another suitable type of engine, such as a gasoline type engine or another suitable type of engine. One or more electric motors (or motor-generators) may additionally generate drive torque.

Air is drawn into the engine 102 through an intake manifold 104. Airflow into the engine 102 may be varied using a throttle valve (not shown) in various types of engines. One or more fuel injectors, such as fuel injector 110, mix fuel with the air to form an air/fuel mixture. A fuel actuator module 112 may control the fuel injectors. The air/fuel mixture is combusted within cylinders of the engine 102, such as cylinder 114. Although the engine 102 is depicted as including one cylinder, the engine 102 may include more than one cylinder.

Exhaust is expelled from the engine 102 to an exhaust system 120. The exhaust may include particulate matter (PM) and exhaust gas. The exhaust (gas) includes nitrogen oxides (NOx), such as nitrogen oxide (NO) and nitrogen dioxide ($NO_2$). The exhaust system 120 includes a treatment system (not specifically numbered) that reduces the respective amounts of NOx and PM in the exhaust.

The exhaust system 120 includes an oxidation catalyst (OC) 122 and a particulate filter 124. For example only, the OC 122 may include a diesel oxidation catalyst (DOC), and the particulate filter 124 may include a diesel particulate filter (DPF). The exhaust system 120 may also include a selective catalytic reduction (SCR) catalyst (not shown). In various implementations, the SCR catalyst may be implemented with the particulate filter 124 within one housing.

The exhaust flows from the engine 102 to the OC 122. The exhaust flows from the OC 122 to the particulate filter 124. A fuel injector (not shown) may be implemented to inject fuel into the exhaust system 120 upstream of the OC 122. A dosing agent injector (not shown) may be implemented to inject a dosing agent into the exhaust system 120 upstream of the SCR catalyst. The dosing agent includes urea ($CO(NH_2)_2$), ammonia ($NH_3$), and/or another suitable type of dosing agent that provides ammonia to the SCR catalyst. The dosing agent may also be referred to as an emissions fluid (EF), a diesel emissions fluid (DEF), or a reductant.

Mass air flowrate (MAF) 142 into the engine 102 may be measured using a MAF sensor 146. Mass flow rate of exhaust output by the engine 102, or exhaust flow rate (EFR), may be determined based on the MAF 142. In various implementations, the EFR may be measured using an EFR sensor (not shown). Difference in pressure across the particulate filter 124 may be measured using a delta pressure sensor 150. The difference in pressure across the particulate filter 124 will be referred to as delta pressure 154 (e.g., in hecto-Pascal, hPa).

The delta pressure sensor 150 is associated with an upstream pressure line 166 and a downstream pressure line 170. For example only, the upstream and downstream pressure lines 170 may be hoses or another suitable type of coupler. The delta pressure sensor 150 may include a diaphragm (not shown). A pressure upstream of the particulate filter 124 may be applied to one side of the diaphragm via the upstream pressure line 166. A pressure downstream of the particulate filter 124 may be applied to the other side of the diaphragm via the downstream pressure line 170. The difference between the upstream pressure and the downstream pressure causes the diaphragm to move. The delta pressure sensor 150 generates the delta pressure 154 (e.g., voltage) based on the difference between the upstream and downstream pressures.

Torque output by the engine 102 is selectively transferred to one or more wheels (not shown). Rotational speeds of the wheels of the vehicle may be measured using wheel speed sensors, such as wheel speed sensor 174. A vehicle speed and/or one or more other parameters may be determined based on one or more wheel speeds. One or more other sensors 178 may also be implemented, such as a mass air flowrate (MAF) sensor, an engine speed sensor, and other suitable vehicle sensors.

An engine control module (ECM) 180 controls the torque output of the engine 102. For example only, the fuel actuator module 112 may control fuel injection based on signals from the ECM 180, respectively. The ECM 180 may also control one or more other suitable engine actuators.

The ECM 180 may selectively perform a regeneration of the particulate filter 124 based on the delta pressure 154. The ECM 180 may determine whether to perform a regeneration based on the delta pressure 154. The ECM 180 may determine an amount (e.g., mass in grams) of particulate trapped within the particulate filter 124 based on the delta pressure 154. For example only, the amount of particulate trapped within the particulate filter 124 may increase as the delta pressure 154 increases. An increase in the delta pressure 154 indicates a corresponding restriction in the ability of exhaust to flow through the particulate filter 124, and the restriction is attributable to particulate matter. The ECM 180 may selectively initiate a regeneration of the particulate filter 124 when the amount is greater than a predetermined amount. The ECM 180 may also determine one or more other parameters, such as the period of a regeneration, based on the delta pressure 154.

Regeneration of the particulate filter 124 involves clearing particulate trapped within the particulate filter 124 by burning the trapped particulate. The particulate burns at temperatures greater than a predetermined temperature. The ECM 180 may selectively provide fuel to the OC 122 to regenerate the particulate filter 124. For example only, the ECM 180 may provide fuel to the cylinders of the engine 102 such that the fuel is exhausted from the cylinders (e.g., during the exhaust strokes of the cylinders), inject fuel into the exhaust system 120 upstream of the OC 122, or provide fuel to the OC 122 in another suitable manner. Burning of the fuel provides heat to the particulate filter 124 for combustion of particulate. The ECM 180 may additionally or alternatively activate the electric heater for regeneration.

The ECM 180 may include a disconnection detection module 190 that selectively determines whether the downstream pressure line 170 has been disconnected (e.g., by a user). The disconnection detection module 190 selectively determines whether the downstream pressure line 170 is disconnected based on a comparison of the delta pressure 154 and a predetermined pressure. The delta pressure 154 being greater than the predetermined pressure after a regeneration indicates that the downstream pressure line 170 is likely disconnected.

The disconnection detection module 190 performs the comparison to determine whether the downstream pressure line 170 is disconnected when one or more enabling conditions are satisfied. More specifically, the disconnection detection module 190 may perform the comparison within a period after a regeneration of the particulate filter 124 is complete.

For example only, the disconnection detection module 190 may perform the comparison when a total distance traveled after the regeneration was completed is less than a predetermined distance. Additionally or alternatively, the disconnection detection module 190 may perform the comparison when a total amount of fuel provided to the engine 102 after the regeneration was completed is less than a predetermined amount. Additionally or alternatively, the disconnection detection module 190 may perform the comparison when a total engine runtime period after the regeneration was completed is less than a predetermined period.

The comparison may be performed when the one or more enabling conditions are satisfied to limit the comparison to times when the amount of particulate trapped within the particulate filter 124 is likely low. The disconnection detection module 190 may take one or more remedial actions when the downstream pressure line 170 is disconnected. For example only, the disconnection detection module 190 may illuminate a malfunction indicator lamp (MIL) 194, such as a service vehicle lamp, and/or take one or more other suitable remedial actions.

Figure 2:
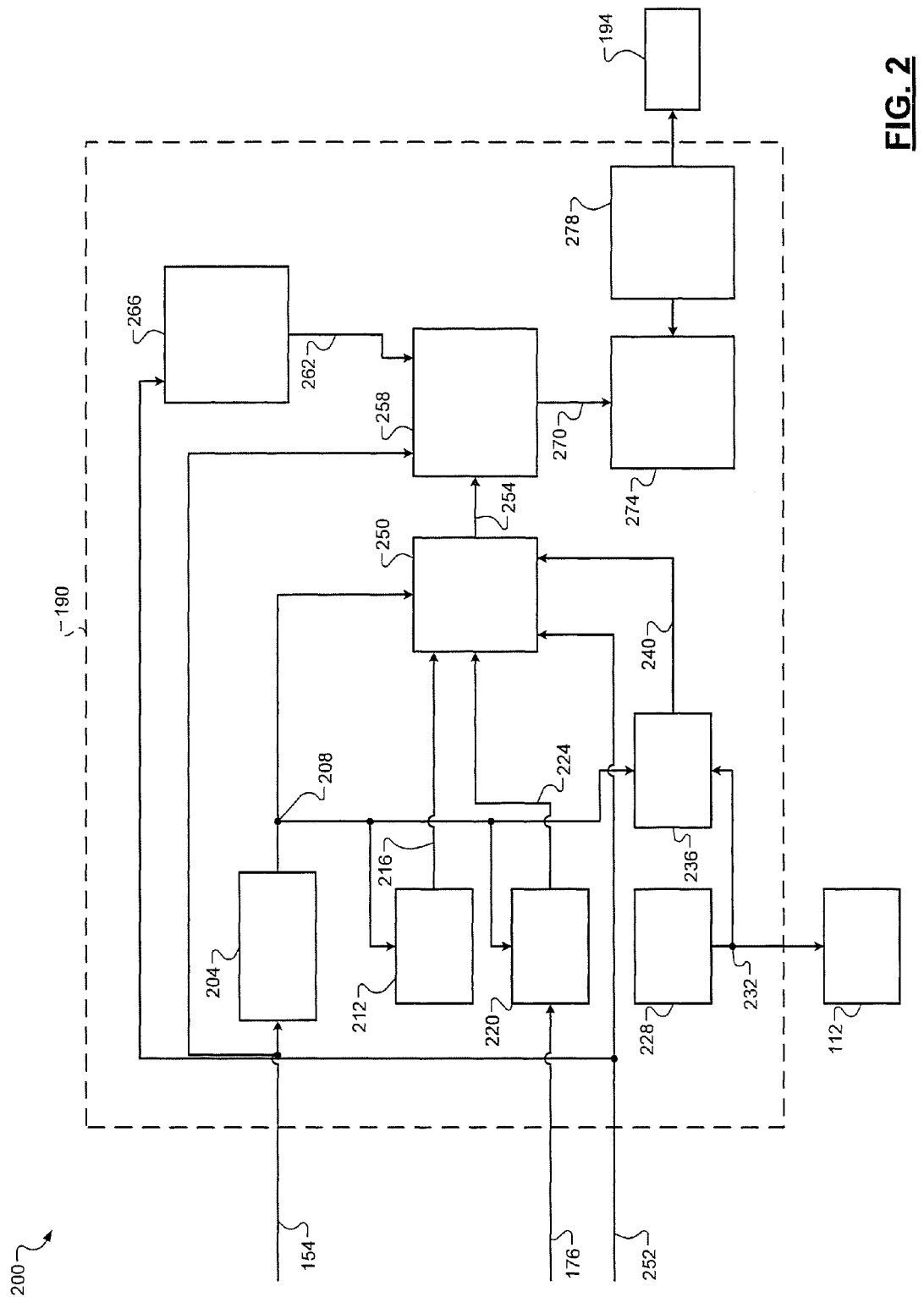
FIG. 2 is a functional block diagram of an example engine control system according to the present disclosure.

Referring now to FIG. 2, a functional block diagram of an example engine control system 200 including the disconnection detection module 190 is presented. A regeneration module 204 may generate a regeneration status 208. For example only, the regeneration module 204 may set the regeneration status 208 at a given time to regeneration inactive, regeneration active, regeneration needed, regeneration complete, or another suitable regeneration status. The regeneration module 204 may set the regeneration status 208 based on the delta pressure 154 and one or more other suitable parameters.

When a regeneration of the particulate filter 124 is not being performed, the regeneration module 204 may set the regeneration status 208 to regeneration inactive. The regeneration module 204 may set the regeneration status 208 to regeneration needed when the amount (e.g., mass) of particulate trapped within the particulate filter 124 is greater than a predetermined amount. The amount of particulate trapped within the particulate filter 124 may be determined based on the delta pressure 154 and one or more other suitable parameters.

When particulate is combusting, the regeneration module 204 may selectively set the regeneration status 208 to regeneration active. The regeneration module 204 may set the regeneration status 208 to regeneration complete, for example, a predetermined period after particulate combustion begins. The predetermined period may be set, for example, based on the amount of particulate trapped within the particulate filter 124 when particulate combustion began and/or one or more other suitable parameters.

When a regeneration is complete, the delta pressure 154 should be a minimum value. From the minimum value, the delta pressure 154 may increase during operation of the engine 102 until a next regeneration. The delta pressure 154 may increase as the amount of particulate trapped within the particulate filter 124 increases because particulate matter trapped within the particulate filter 124 restricts the ability of exhaust to flow through the particulate filter 124.

When a regeneration is complete, a timer module 212 resets an accumulated engine runtime period 216. The timer module 212 increments the accumulated engine runtime period 216 as the engine 102 runs (i.e., is combusting air and fuel). In this manner, the accumulated engine runtime period 216 tracks the period that the engine 102 has ran since a last regeneration of the particulate filter 124 was complete. The timer module 212 may reset the accumulated engine runtime period 216 to a predetermined reset value, such as zero.

A distance tracking module 220 resets an accumulated distance traveled 224 when the regeneration is complete. The distance tracking module 220 may reset the accumulated distance traveled 224 to a predetermined reset value, such as zero. The distance tracking module 220 increments the accumulated distance traveled 224 as the vehicle moves. For example only, the distance tracking module 220 may determine the distance that the vehicle travelled over a control loop based on one or more wheel speeds, such as the wheel speed 176, and/or one or more other suitable parameters, such as transmission output shaft speed. The accumulated distance traveled 224 tracks the distance traveled by the vehicle since the last regeneration of the particulate filter 124 was complete.

A fuel control module 228 generates a fueling command 232, and the fuel actuator module 112 injects fuel based on the fueling command 232. For example only, the fueling command 232 may indicate an amount of fuel to inject for a given combustion event and a time (e.g., crankshaft position) at which to begin the injection of the amount of fuel.

A fuel tracking module 236 resets an accumulated fueling amount 240 (e.g., mass) when the regeneration is complete. The fuel tracking module 236 may reset the accumulated fueling amount 240 to a predetermined reset value, such as zero. The fuel tracking module 236 monitors the fueling command 232 and increments the accumulated fueling amount 240 as fuel is provided to the engine 102 based on the fueling command 232. In this manner, the accumulated fueling amount 240 corresponds to the total amount of fuel that has been injected since the last regeneration of the particulate filter 124 was complete.

In response to the regeneration of the particulate filter 124 being complete, an enabling module 250 monitors the accumulated engine runtime period 216, the accumulated distance traveled 224, the accumulated fueling amount 240, an EFR 252, and/or one or more other suitable parameters. The enabling module 250 generates an enable signal 254 based on the accumulated engine runtime period 216, the accumulated distance traveled 224, the accumulated fueling amount 240, the EFR 252, and/or the one or more other suitable parameters.

For example only, the enabling module 250 may set the enable signal 254 to an active state when one, more than one, or all of:
(i) the accumulated engine runtime period 216 is less than a predetermined period;
(ii) the accumulated distance traveled 224 is less than a predetermined distance;
(iii) the accumulated fueling amount 240 is less than a predetermined amount; and
(iv) the EFR 252 is within a predetermined flow rate range.
Written conversely, the enabling module 250 may set the enable signal to an inactive state when at least one of:
(i) the accumulated engine runtime period 216 is greater than or equal to the predetermined period;
(ii) the accumulated distance traveled 224 is greater than or equal to the predetermined distance;
(iii) the accumulated fueling amount 240 is greater than or equal to the predetermined amount; and
(iv) the EFR 252 is greater than or less than the predetermined flow rate range.

The EFR 252 may be determined, for example, based on the MAF 142, measured using an EFR sensor, or obtained in another suitable manner. For example only, the predetermined period may be approximately 10 minutes, and the predetermined flow rate range may be from approximately 600 cubic meters per hour (m³/h) to approximately 1500 m³/h. For example only, the predetermined distance may be approximately 30 miles, and the predetermined amount may be approximately 3 gallons of fuel. The enabling module 250 may additionally or alternatively set the enable signal 254 to the active state when a surface temperature of the particulate filter 124 is within a first predetermined range and/or an exhaust gas temperature is within a second predetermined range. Written conversely, the enabling module 250 may set the enable signal the inactive state when the surface temperature is outside of the first predetermined range and/or the exhaust gas temperature is outside of the second predetermined range.

The enabling module 250 enables and disables a disconnection indication module 258 via the enable signal 254. The disconnection indication module 258 may be disabled when the enable signal 254 is in the inactive state. The disconnection indication module 258 may be enabled when the enable signal 254 is in the active state.

When enabled, the disconnection indication module 258 determines whether the downstream pressure line 170 is disconnected. The disconnection indication module 258 determines whether the downstream pressure line 170 is disconnected based on a comparison of the delta pressure 154 and a predetermined pressure 262.

The disconnection indication module 258 indicates that the downstream pressure line 170 is disconnected when the delta pressure 154 is greater than the predetermined pressure 262. The disconnection indication module 258 may indicate that the downstream pressure line 170 is not disconnected when the delta pressure 154 is less than the predetermined pressure 262. The delta pressure 154 may be greater than it should be when the downstream pressure line 170 is disconnected. The disconnection may be the downstream pressure line 170 being disconnected at the end where the downstream pressure line 170 receives the downstream pressure, at the end where the downstream pressure line 170 connects to the delta pressure sensor 150, or both.

Figure 3:
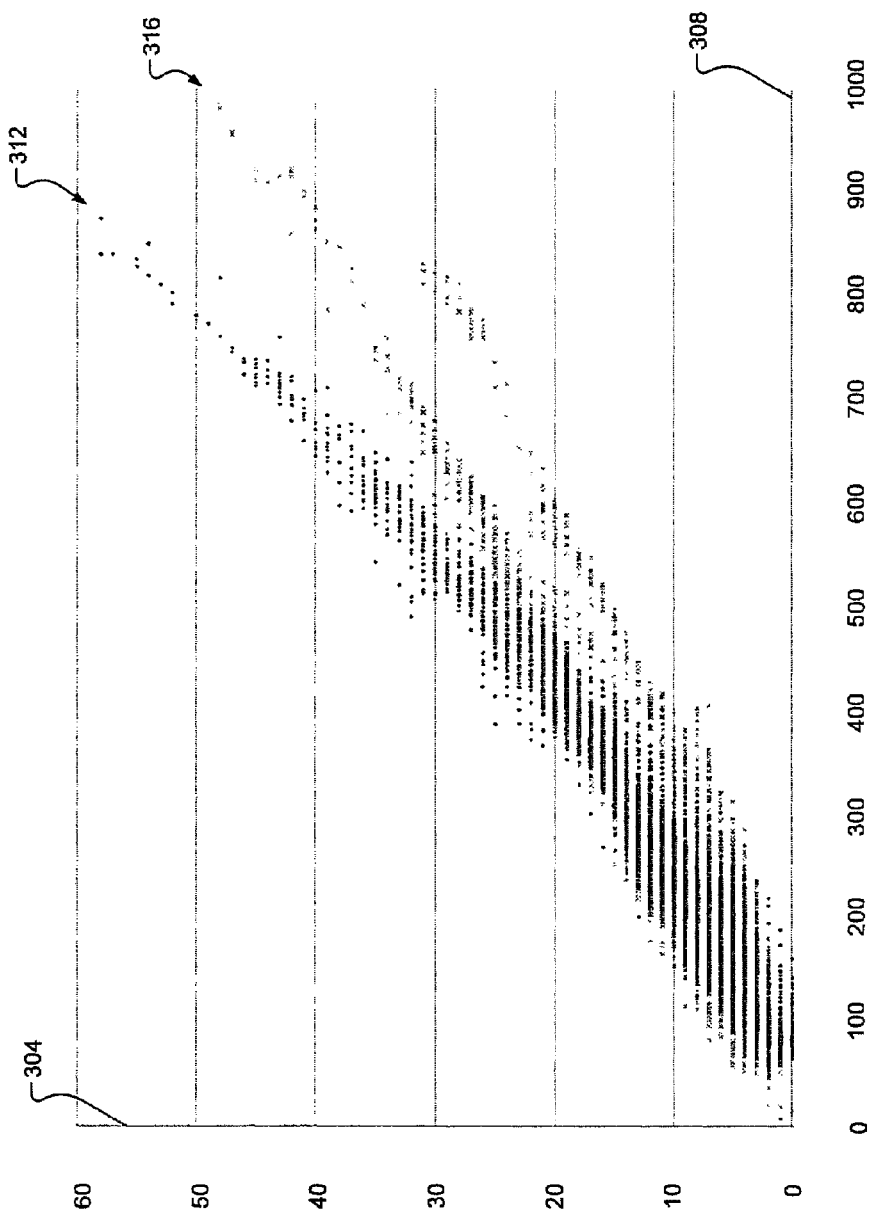
FIG. 3 is an example graph of delta pressure as a function of exhaust flow rate according to the present disclosure.

Referring now to FIG. 3, an example graph of delta pressure 304 as a function of EFR 308 is presented. Example diamond-shaped marks 312 each correspond to an example value of the delta pressure 304 at a given value of the EFR 308 when the downstream pressure line 170 is disconnected. Example X-shaped marks 316 each correspond to an example value of the delta pressure 304 at a given value of the EFR 308 when the downstream pressure line 170 is connected to the delta pressure sensor 150. As illustrated by the diamond-shaped marks 312 at a given value of the EFR 308 being greater than the X-shaped marks 316 at that value of the EFR 308, the delta pressure 154 may increase when the downstream pressure line 170 is disconnected.

Referring back to FIG. 2, in various implementations, the predetermined pressure 262 may be a fixed value or a variable value. The predetermined pressure 262 is non-zero. A pressure determination module 266 may set the predetermined pressure 262 based on, for example, the EFR 252, the amount of particulate trapped within the particulate filter 124, and/or one or more other suitable parameters. For example only, the pressure determination module 266 may determine the predetermined pressure 262 using a mapping (e.g., a lookup table) of values for the predetermined pressure 262. The predetermined pressure 262 may increase as the EFR 252 increases and vice versa. For example only, at values of the EFR 252 of approximately 600, 700, 800, 900, 1000, and 1500 m³/h, the predetermined pressure 262 may be approximately 30, 27, 46, 55, 65, and 130 hectopascal (hPa), respectively.

The disconnection indication module 258 may generate a disconnection indicator 270 that indicates whether the downstream pressure line 170 is disconnected. For example only, the disconnection indication module 258 may set the disconnection indicator 270 to an active state when the downstream pressure line 170 is disconnected. For example only, the disconnection indicator 270 may be a predetermined code (e.g., a diagnostic trouble code or DTC) or a type of flag associated with a predetermined code that indicates that the downstream pressure line 170 is disconnected.

The disconnection indication module 258 may store the disconnection indicator 270 in memory 274. A monitoring module 278 may monitor the memory 274. When the disconnection indicator 270 is generated (i.e., when the downstream pressure line 170 is disconnected), the monitoring module 278 may take one or more remedial actions. For example only, the monitoring module 278 may illuminate the malfunction indicator lamp 194, reduce engine performance, and/or take one or more other remedial actions.

Figure 4:
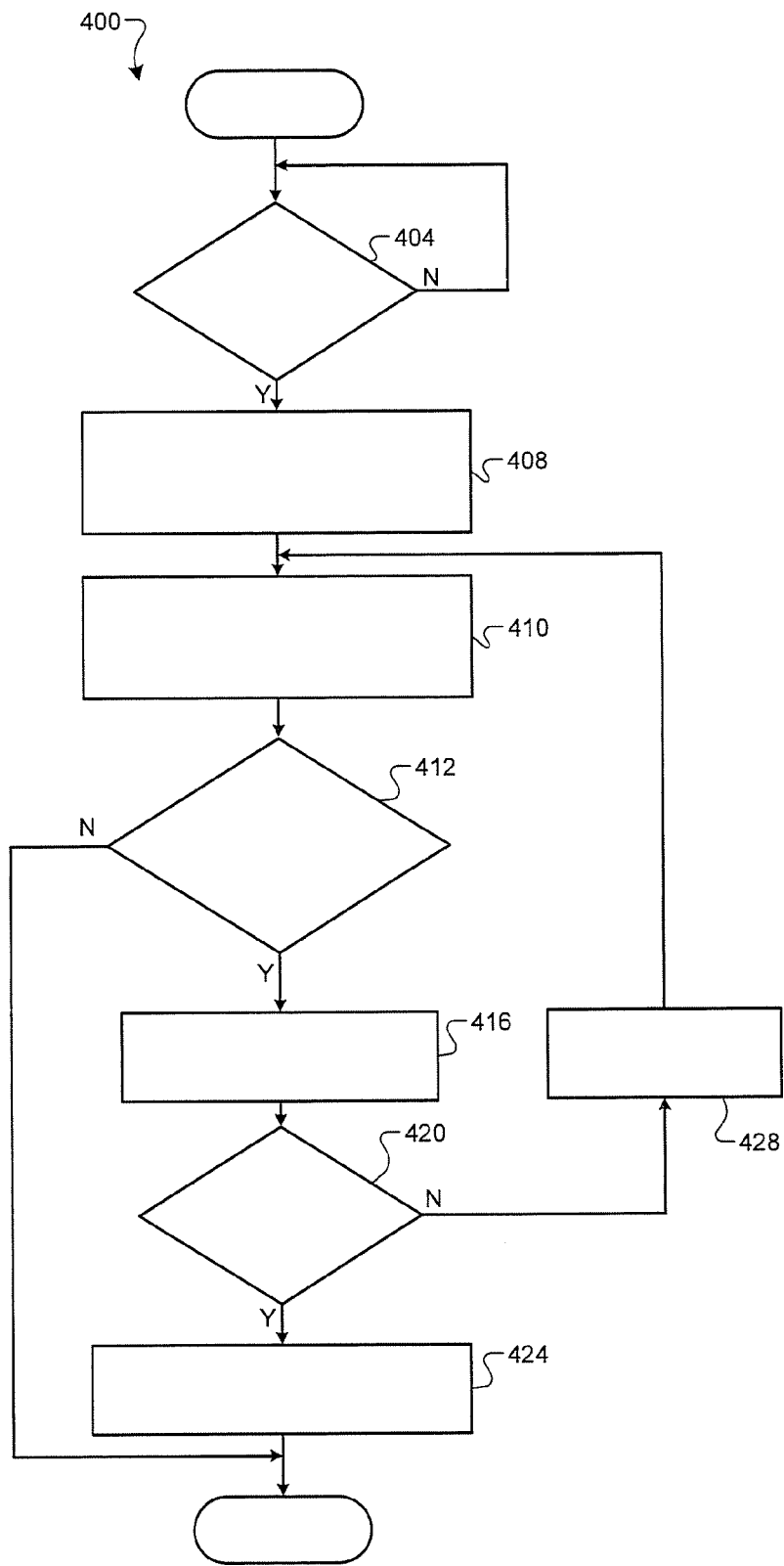
FIG. 4 is a flowchart depicting an example method of identifying when a pressure sensor is disconnected according to the present disclosure.

Referring now to FIG. 4, a flowchart depicting an example method 400 of determining and indicating whether the downstream pressure line 170 is disconnected is presented. Control may begin at 404 where control determines whether a regeneration of the particulate filter 124 is complete. If true, control may continue with 408; if false, control may remain at 404.

At 408, control may reset the accumulated engine runtime period 216, the accumulated distance traveled 224, and the accumulated fueling amount 240. AT 410, control updates the accumulated engine runtime period 216, the accumulated distance travelled 224, and the accumulated fueling amount 240. Control may determine whether the one or more enabling conditions are satisfied at 412. For example only, control may determine whether the accumulated engine runtime period 216, the accumulated distance traveled 224, and the accumulated fueling amount 240 are less than the predetermined period, the predetermined distance, and the predetermined amount, respectively, at 412. Additionally, control may determine whether the EFR 252 is within the predetermined range at 412, the surface temperature is within the first predetermined range, and/or the exhaust gas temperature is within the second predetermined range. If true, control may continue with 416; if false, control may end. During a first iteration of 412, the enabling conditions may be satisfied due to the resetting in 408. If not, control may remain at 412 until the enabling conditions are satisfied instead of ending.

At 416, control determines the predetermined pressure 262. For example only, control may determine the predetermined pressure 262 as a function of the EFR 252, or the predetermined pressure 262 may be a fixed value. Control determines whether the delta pressure 154 is greater than the predetermined pressure 262 at 420. If true, control may indicate that the downstream pressure line 170 is disconnected (e.g., by generating the disconnection indicator 270) at 424, and control may end. If false, control may indicate that the downstream pressure line 170 is connected to the delta pressure sensor 150 at 428 and return to 410.

In various implementations, control may require that the delta pressure 154 be greater than the predetermined pressure 262 at least a predetermined period over a predetermined number of key cycles of the vehicle before indicating that the downstream pressure line 170 is disconnected. One key cycle may refer to the period between key on and key off. For example only, the predetermined number is an integer greater than zero and may be two in various implementations.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a regeneration module that indicates when a regeneration of a particulate filter is complete; and
a disconnection indication module (i) that receives a pressure difference across the particulate filter measured using delta pressure sensor, wherein the delta pressure sensor generates the pressure difference based on first and second pressures upstream and downstream of the particulate filter applied to the delta pressure sensor using upstream and downstream pressure lines, respectively, and (ii) that, in response to the indication that the regeneration of the particulate filter is complete, selectively indicates that the downstream pressure line is disconnected based on a comparison of the pressure difference and a predetermined pressure.

2. The system of claim 1 wherein the disconnection indication module selectively indicates that the downstream pressure line is disconnected when the pressure difference is greater than the predetermined pressure.

3. The system of claim 1 further comprising an enabling module that disables the disconnection indication module when an exhaust flow rate is one of less than a predetermined minimum flow rate and greater than a predetermined maximum flow rate.

4. The system of claim 1 further comprising an enabling module that disables the disconnection indication module when an accumulated period of runtime of an engine after the regeneration is complete is greater than a predetermined period.

5. The system of claim 1 further comprising an enabling module that disables the disconnection indication module when an accumulated amount of fuel provided to an engine after the regeneration is complete is greater than a predetermined amount.

6. The system of claim 1 further comprising an enabling module that disables the disconnection indication module when a distance traveled by the vehicle after the regeneration is complete is greater than a predetermined distance.

7. The system of claim 1 further comprising an enabling module that enables the disconnection indication module to perform the comparison in response to a determination that an exhaust flow rate is within a predetermined flow rate range, an accumulated period of runtime of an engine after the regeneration is complete is less than a predetermined period, an accumulated amount of fuel provided to the engine after the regeneration is complete is less than a predetermined amount, a distance traveled by the vehicle after the regeneration is complete is less than a predetermined distance, and a temperature of a surface of the particulate filter is within a predetermined temperature range.

8. The system of claim 1 further comprising a pressure determination module that determines the predetermined pressure based on an exhaust flow rate.

9. The system of claim 8 wherein the pressure determination module increases the predetermined pressure as the exhaust flow rate increases.

10. The system of claim 1 wherein the disconnection indication module at least one of sets a diagnostic trouble code (DTC) and triggers illumination of a malfunction indicator lamp when the downstream pressure line is disconnected.

11. A method for a vehicle, comprising:
indicating when a regeneration of a particulate filter is complete;
receiving a pressure difference across the particulate filter measured using delta pressure sensor that generates the pressure difference based on first and second pressures upstream and downstream of the particulate filter applied to the delta pressure sensor using upstream and downstream pressure lines, respectively; and
in response to the indication that the regeneration of the particulate filter is complete, selectively indicating that the downstream pressure line is disconnected based on a comparison of the pressure difference and a predetermined pressure.

12. The method of claim 11 further comprising selectively indicating that the downstream pressure line is disconnected when the pressure difference is greater than the predetermined pressure.

13. The method of claim 11 further comprising disabling the comparison when an exhaust flow rate is one of less than a predetermined minimum flow rate and greater than a predetermined maximum flow rate.

14. The method of claim 11 further comprising disabling the comparison when an accumulated period of runtime of an engine after the regeneration is complete is greater than a predetermined period.

15. The method of claim 11 further comprising disabling the comparison when an accumulated amount of fuel provided to an engine after the regeneration is complete is greater than a predetermined amount.

16. The method of claim 11 further comprising disabling the comparison when a distance traveled by the vehicle after the regeneration is complete is greater than a predetermined distance.

17. The method of claim 11 further comprising performing the comparison in response to a determination that an exhaust flow rate is within a predetermined flow rate range, an accumulated period of runtime of an engine after the regeneration is complete is less than a predetermined period, an accumulated amount of fuel provided to the engine after the regeneration is complete is less than a predetermined amount, a distance traveled by the vehicle after the regeneration is complete is less than a predetermined distance, and a temperature of a surface of the particulate filter is within a predetermined temperature range.

18. The method of claim 11 further comprising determining the predetermined pressure based on an exhaust flow rate.

19. The method of claim 18 further comprising increasing the predetermined pressure as the exhaust flow rate increases.

20. The method of claim 11 further comprising at least one of:
    setting a diagnostic trouble code (DTC) when the downstream pressure line is disconnected; and
    triggering illumination of a malfunction indicator lamp when the downstream pressure line is disconnected.

* * * * *